US012604229B2

(12) United States Patent
He et al.

(10) Patent No.: US 12,604,229 B2
(45) Date of Patent: Apr. 14, 2026

(54) EXCHANGING DATA TRAFFIC BETWEEN NETWORK NODES IN A DEVICE-TO-DEVICE COMMUNICATION NETWORK AND AN EXTERNAL DATA NETWORK

(71) Applicant: Dell Products L.P., Round Rock, TX (US)

(72) Inventors: Bin He, Shanghai (CN); Wenlei Wu, Shanghai (CN); Zhen Jia, Shanghai (CN); George M. Ericson, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 441 days.

(21) Appl. No.: 18/141,507

(22) Filed: May 1, 2023

(65) Prior Publication Data

US 2024/0373275 A1     Nov. 7, 2024

(51) Int. Cl.
*H04W 28/02* (2009.01)
*H04W 40/20* (2009.01)
(Continued)

(52) U.S. Cl.
CPC ..... *H04W 28/021* (2013.01); *H04W 28/0236* (2013.01); *H04W 40/20* (2013.01);
(Continued)

(58) Field of Classification Search
CPC ........... H04W 28/021; H04W 28/0236; H04W 84/18; H04W 48/17; H04W 28/0221;
(Continued)

(56) References Cited

U.S. PATENT DOCUMENTS

2014/0355483 A1* 12/2014 Jang ........................ H04W 8/26
370/254
2016/0219639 A1* 7/2016 Agiwal ................. H04W 76/14
(Continued)

OTHER PUBLICATIONS

Vanganurur, et al, "System Capacity and Coverage of a Cellular Network with D2D Mobile Relays", IEEE, 2013 (Year: 2013).*
(Continued)

*Primary Examiner* — Omer S Mian
(74) *Attorney, Agent, or Firm* — Ryan, Mason & Lewis, LLP

(57) ABSTRACT

An apparatus comprises a processing device configured to generate a link-local network address for a given network node in a device-to-device communication network based on a unique identifier associated with the given network node. The processing device is also configured to determine at least one measure of radio access network signal strength for the given network node for at least one corresponding radio access network, and to assign one of a first and a second communication role in the device-to-device communication network to the given network node based at least in part on whether the at least one measure of the radio access network signal strength is above or below a designated threshold. The processing device is further configured to exchange data traffic between the given network node and the external data network based on which of the first and second communication roles is assigned to the given network node.

20 Claims, 14 Drawing Sheets

(51) Int. Cl.

| | |
|---|---|
| *H04W 76/14* | (2018.01) |
| *H04W 84/20* | (2009.01) |
| *H04W 84/18* | (2009.01) |

(52) U.S. Cl.
CPC ........... *H04W 76/14* (2018.02); *H04W 84/20* (2013.01); *H04W 84/18* (2013.01)

(58) Field of Classification Search
CPC . H04W 76/14; H04W 28/0278; H04W 40/02; H04W 40/16; H04W 40/20; H04W 40/22; H04W 84/20; Y02D 30/70
See application file for complete search history.

(56) References Cited

U.S. PATENT DOCUMENTS

| | | | |
|---|---|---|---|
| 2016/0255556 A1* | 9/2016 | Michel | H04L 47/17 |
| | | | 455/456.3 |
| 2021/0112609 A1* | 4/2021 | Baligh | H04W 40/16 |
| 2022/0092986 A1* | 3/2022 | Lund | G08G 1/0112 |
| 2023/0199606 A1* | 6/2023 | Freda | H04B 7/155 |

OTHER PUBLICATIONS

Sun et al, "Blockchain enabled UE-assisted multi-connectivity scheme", IEEE, 2021 (Year: 2021).*

U.S. Department of Transportation, "Vehicle-to-Vehicle Communication Technology," https://www.its.dot.gov/factsheets/pdf/safetypilot_nhtsa_factsheet.pdf, Oct. 2014, 4 pages.

3GPP, "3rd Generation Partnership Project; Technical Specification Group Services and System Aspects; Architecture Enhancements for 5G System (5GS) to Support Vehicle-to-Everything (V2X) Services (Release 17)." 3GPP TS 23.287 V17.6.0, Mar. 2023, 60 pages.

3GPP, "3rd Generation Partnership Project; Technical Specification Group Radio Access Network; NR; NR and NG-RAN Overall Description; Stage 2 (Release 17)." 3GPP TS 38.300 V17.3.0, Dec. 2022, 210 pages.

T. Shimizu et al., "Comparison of DSRC and LTE-V2X PC5 Mode 4 Performance in High Vehicle Density Scenarios," 26th ITS World Congress, Paper ID AM-TP2188, Oct. 2019, 10 pages.

5GAA, "An Assessment of LTE-V2X (PC5) and 802.11p Direct Communications Technologies for Improved Road Safety in the EU," Dec. 5, 2017, 80 pages.

S. Thomson et al., "IPV6 Stateless Address Autoconfiguration," Network Working Group Request for Comments: 2462, Dec. 1998, 25 pages.

S. Thomson et al., "IPV6 Stateless Address Autoconfiguration," Network Working Group Request for Comments: 4862, Sep. 2007, 30 pages.

National Highway Traffic Safety Administration, "Vehicle-to-Vehicle Communication," https://www.nhtsa.gov/technology-innovation/vehicle-vehicle-communication, Accessed Apr. 26, 2023, 7 pages.

K. N. Qureshi et al., "A Survey on Intelligent Transportation Systems," Middle-East Journal of Scientific Research, vol. 15, No. 5, Jan. 2013, pp. 629-642.

D. B. Johnson et al., "Dynamic Source Routing in Ad Hoc Wireless Networks," Mobile Computing, The Kluwer International Series in Engineering and Computer Science, vol. 353, Springer, 1996, 29 pages.

F. Arena et al., "A Review on IEEE 802.11p for Intelligent Transportation Systems," Journal of Sensor and Actuator Networks, vol. 9, No. 22, Apr. 26, 2020, 11 pages.

P. Kuppusamy et al., "A Study and Comparison of OLSR, AODV and TORA Routing Protocols in Ad Hoc Networks," 3rd International Conference on Electronics Computer Technology, Apr. 2011, pp. 143-147.

G. Jayakumar et al, "Ad Hoc Mobile Wireless Networks Routing Protocols—A Review," Journal of Computer Science, vol. 3, No. 8, Aug. 31, 2007, pp. 574-582.

P. K. Maurya et al., "An Overview of AODV Routing Protocol," International Journal of Modern Engineering Research, vol. 2, No. 3, May-Jun. 2012, pp. 728-732.

M. Harounabadi et al., "V2X in 3GPP Standardization: NR Sidelink in Rel-16 and Beyond," arXiv:2104.11135v1, Apr. 22, 2021, 10 pages.

* cited by examiner

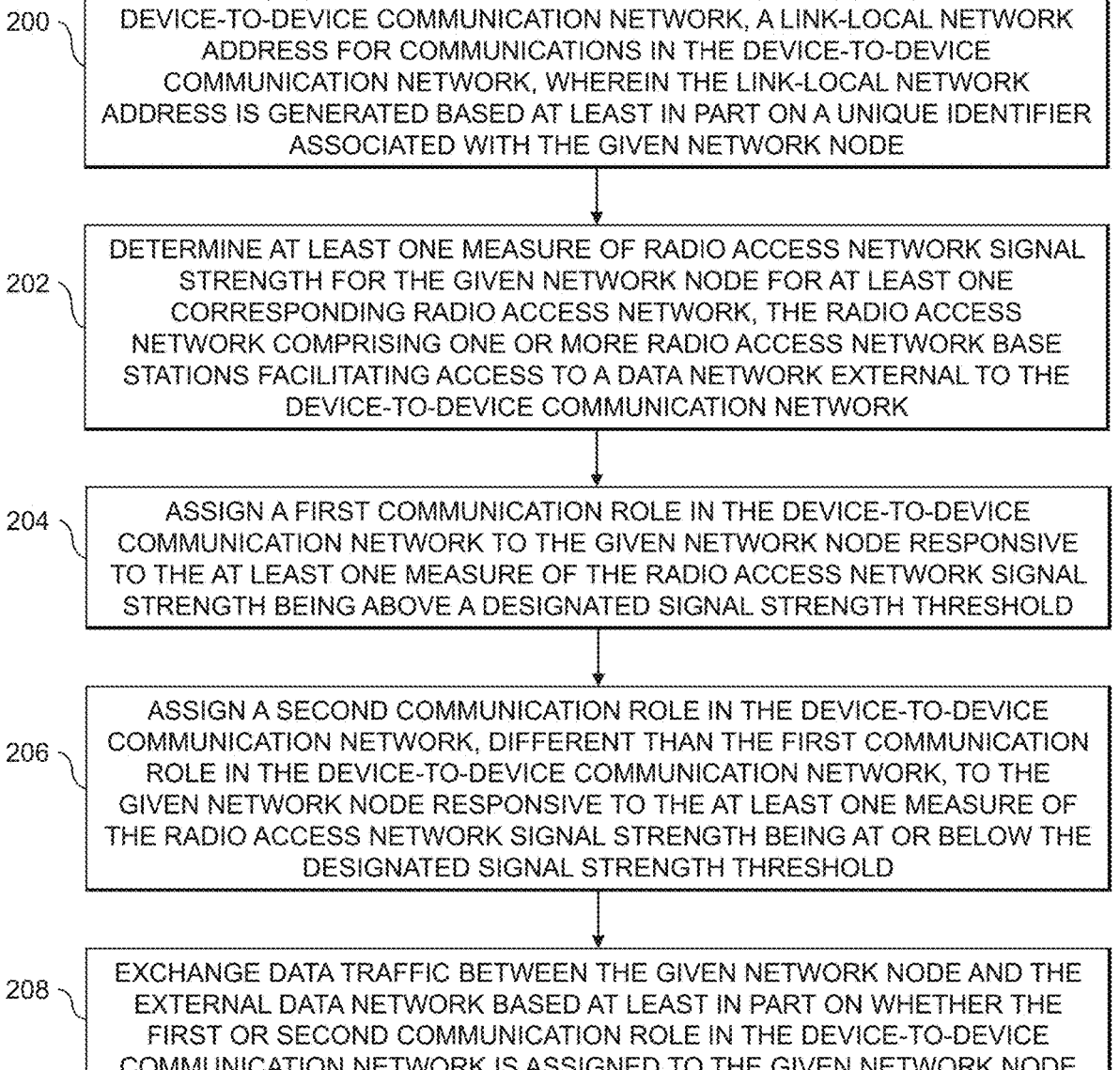

200 — GENERATE, FOR A GIVEN ONE OF A PLURALITY OF NETWORK NODES IN A DEVICE-TO-DEVICE COMMUNICATION NETWORK, A LINK-LOCAL NETWORK ADDRESS FOR COMMUNICATIONS IN THE DEVICE-TO-DEVICE COMMUNICATION NETWORK, WHEREIN THE LINK-LOCAL NETWORK ADDRESS IS GENERATED BASED AT LEAST IN PART ON A UNIQUE IDENTIFIER ASSOCIATED WITH THE GIVEN NETWORK NODE

202 — DETERMINE AT LEAST ONE MEASURE OF RADIO ACCESS NETWORK SIGNAL STRENGTH FOR THE GIVEN NETWORK NODE FOR AT LEAST ONE CORRESPONDING RADIO ACCESS NETWORK, THE RADIO ACCESS NETWORK COMPRISING ONE OR MORE RADIO ACCESS NETWORK BASE STATIONS FACILITATING ACCESS TO A DATA NETWORK EXTERNAL TO THE DEVICE-TO-DEVICE COMMUNICATION NETWORK

204 — ASSIGN A FIRST COMMUNICATION ROLE IN THE DEVICE-TO-DEVICE COMMUNICATION NETWORK TO THE GIVEN NETWORK NODE RESPONSIVE TO THE AT LEAST ONE MEASURE OF THE RADIO ACCESS NETWORK SIGNAL STRENGTH BEING ABOVE A DESIGNATED SIGNAL STRENGTH THRESHOLD

206 — ASSIGN A SECOND COMMUNICATION ROLE IN THE DEVICE-TO-DEVICE COMMUNICATION NETWORK, DIFFERENT THAN THE FIRST COMMUNICATION ROLE IN THE DEVICE-TO-DEVICE COMMUNICATION NETWORK, TO THE GIVEN NETWORK NODE RESPONSIVE TO THE AT LEAST ONE MEASURE OF THE RADIO ACCESS NETWORK SIGNAL STRENGTH BEING AT OR BELOW THE DESIGNATED SIGNAL STRENGTH THRESHOLD

208 — EXCHANGE DATA TRAFFIC BETWEEN THE GIVEN NETWORK NODE AND THE EXTERNAL DATA NETWORK BASED AT LEAST IN PART ON WHETHER THE FIRST OR SECOND COMMUNICATION ROLE IN THE DEVICE-TO-DEVICE COMMUNICATION NETWORK IS ASSIGNED TO THE GIVEN NETWORK NODE

FIG. 2

375
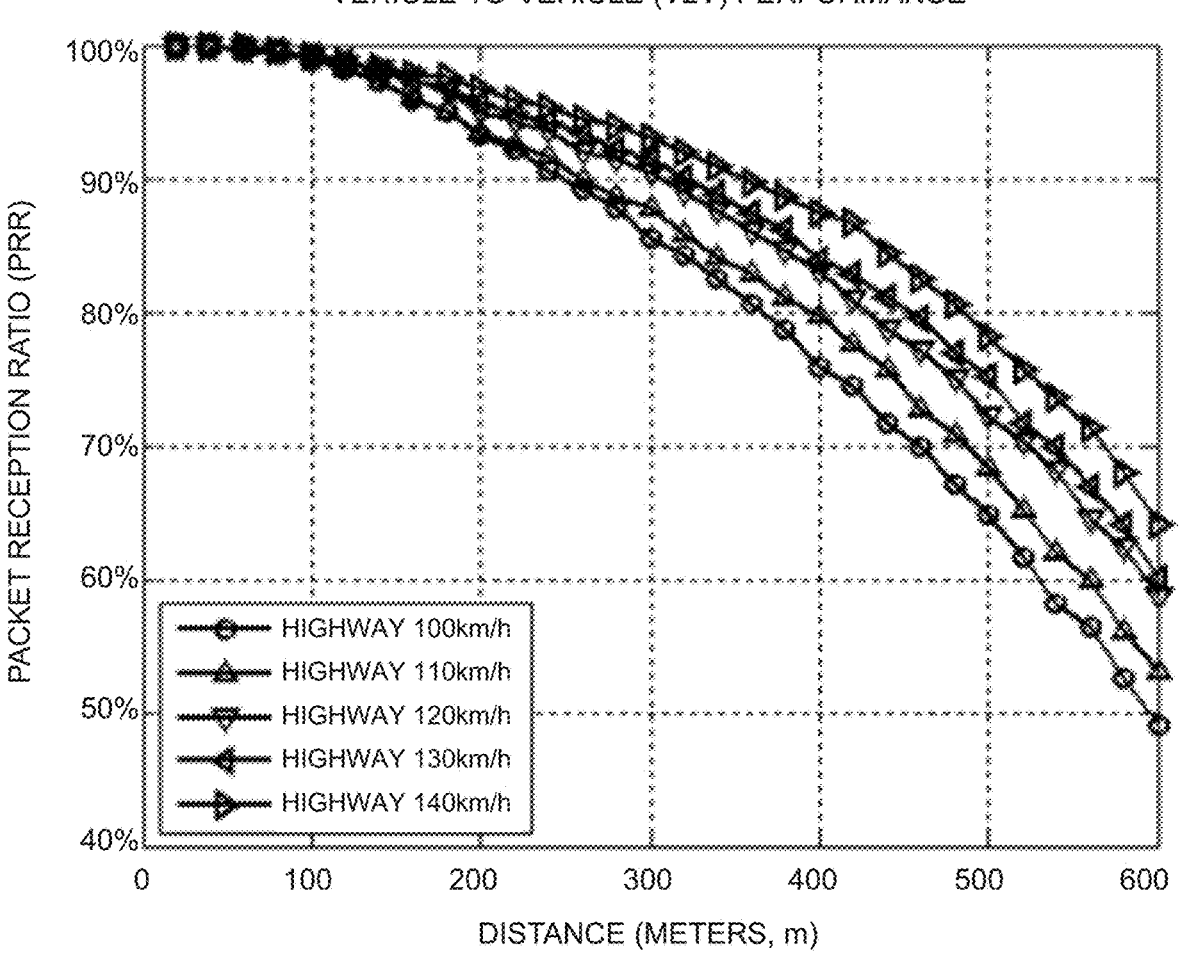
FIG. 3C

650

RAN SIGNAL DETECTED AND
CONNECTION ESTABLISHED

CONSTRAINED
NETWORK
NODE

1

2

BRIDGING
NETWORK
NODE

RAN SIGNAL DISCONNECTED

675

| STATUS | ACTIVITY |
|--------|----------|
| 1 | AD HOC NETWORK NORMAL NODE |
| 1 → 2 | RAN SIGNAL DETECTED |
| 2 | BRIDGING NODE |
| 2 → 1 | RAN SIGNAL DISCONNECTED |

EXCHANGING DATA TRAFFIC BETWEEN NETWORK NODES IN A DEVICE-TO-DEVICE COMMUNICATION NETWORK AND AN EXTERNAL DATA NETWORK

FIELD

The field relates generally to communication networks, and more particularly to network traffic management.

BACKGROUND

Device-to-device (D2D) communications permit communication among devices in an ad-hoc network. The devices, also referred to as network nodes, may send data to one another via single or multi-hop communications within the ad-hoc network. Vehicle-to-vehicle (V2V) communications is a branch of D2D communications, which enables vehicles such as automobiles to send and receive messages to one another through communication interfaces between the vehicles. One or more of the vehicles and devices in the ad-hoc network may access an external data network through a radio access network, and can facilitate communications with the external data network from other vehicles or devices in the ad-hoc network which do not have connectivity to the radio access network.

SUMMARY

Illustrative embodiments of the present disclosure provide techniques for exchanging data traffic between network nodes in a device-to-device communication network and an external data network.

In one embodiment, an apparatus comprises at least one processing device comprising a processor coupled to a memory. The at least one processing device is configured to generate, for a given one of a plurality of network nodes in a device-to-device communication network, a link-local network address for communications in the device-to-device communication network, wherein the link-local network address is generated based at least in part on a unique identifier associated with the given network node. The at least one processing device is also configured to determine at least one measure of radio access network signal strength for the given network node for at least one corresponding radio access network, the radio access network comprising one or more radio access network base stations facilitating access to a data network external to the device-to-device communication network. The at least one processing device is further configured, responsive to the at least one measure of the radio access network signal strength being above a designated signal strength threshold, to assign a first communication role in the device-to-device communication network to the given network node. The at least one processing device is further configured, responsive to the at least one measure of the radio access network signal strength being at or below the designated signal strength threshold, to assign a second communication role in the device-to-device communication network, different than the first communication role in the device-to-device communication network, to the given network node. The at least one processing device is further configured to exchange data traffic between the given network node and the external data network based at least in part on whether the first communication role in the device-to-device communication network or the second communication role in the device-to-device communication network is assigned to the given network node.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for exchanging data traffic between network nodes in a device-to-device communication network and an external data network in an illustrative embodiment.

FIGS. 3A-3C show examples of vehicle-to-vehicle systems and their associated performance in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
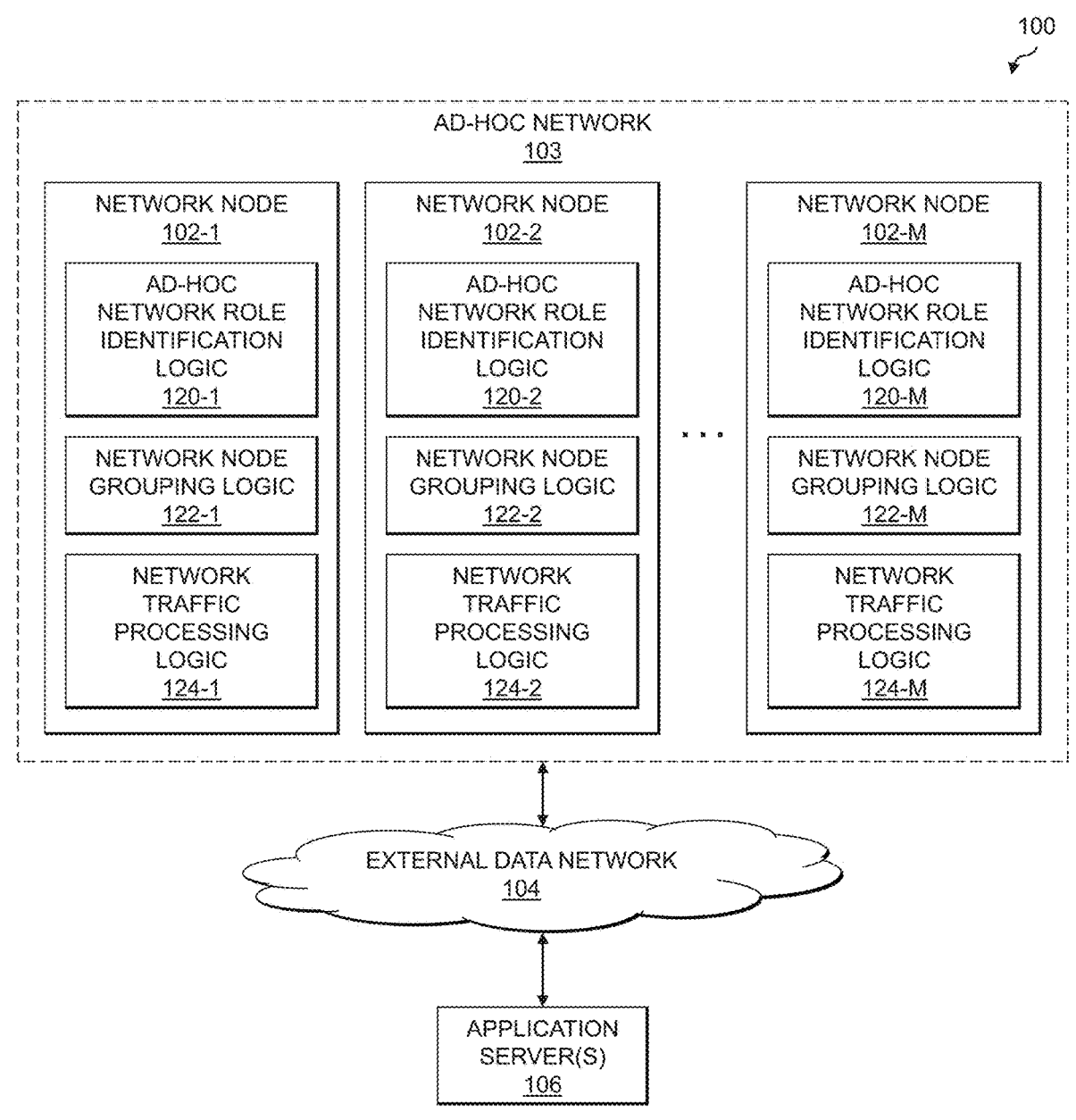
FIG. 1 is a block diagram of an information processing system configured for exchanging data traffic between network nodes in a device-to-device communication network and an external data network in an illustrative embodiment.

FIG. 1 shows an information processing system 100 configured in accordance with an illustrative embodiment. The information processing system 100 is assumed to be built on at least one processing platform and provides functionality for exchanging data traffic between network nodes in a device-to-device (D2D) communication network and an external data network. The information processing system 100 includes a set of network nodes 102-1, 102-2, . . . 102-M (collectively, network nodes 102) which are part of an ad-hoc network 103 (e.g., a D2D communication network such as a vehicle-to-vehicle (V2V) communication network). The network nodes 102 of the ad-hoc network 103 are coupled to an external data network 104, with one or more application servers 106 or other resources being made accessible to the network nodes 102 of the ad-hoc network 103 via the external data network 104. In some embodiments, only a subset of the network nodes 102 in the ad-hoc network 103 have direct access to the external data network 104 (e.g., through one or more Radio Access Network (RAN) base stations), with this subset of the network nodes 102 facilitating access by other ones of the network nodes 102 in the ad-hoc network 103 to the applications servers 106 or other resources available via the external data network 104.

The network nodes 102 may comprise, for example, physical computing devices such as vehicles, IoT devices, mobile telephones, laptop computers, tablet computers, desktop computers or other types of devices, in any combination. Such devices are examples of what are more generally referred to herein as "processing devices." Some of these processing devices are also generally referred to herein as "computers." The network nodes 102 may also or alternately comprise virtualized computing resources, such as virtual machines (VMs), containers, etc. The network nodes 102 are examples of information technology (IT) assets in an IT infrastructure, where the IT assets comprise physical and/or virtual computing resources in the IT infrastructure. Physical computing resources may include physical hardware such as servers, storage systems, networking equipment, Internet of Things (IoT) devices, other types of processing and computing devices including desktops, laptops, tablets, smartphones, etc. Virtual computing resources may include VMs, containers, etc.

The network nodes 102 in some embodiments comprise respective computers associated with a particular company, organization or other enterprise. Thus, the network nodes 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art. As used herein, the term "enterprise system" is intended to be construed broadly to include any group of systems or other computing devices. For example, the network nodes 102 may provide a portion of one or more enterprise systems. A given enterprise system may also or alternatively include one or more of the application servers 106. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The ad-hoc network 103, as noted above, may comprise a V2V or other type of D2D communication network. The external data network 104 is assumed to comprise a global computer network such as the Internet, although other types of networks can be part of the external data network 104, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the network nodes 102 and application servers 106, as well as to support communication between the network nodes 102, the application servers 106 and other related systems and devices not explicitly shown.

The network nodes 102 in the FIG. 1 embodiment are assumed to be implemented using at least one processing device. Each such processing device generally comprises at least one processor and an associated memory, and implements one or more functional modules or logic for controlling certain features of the network nodes 102. In the FIG. 1 embodiment, the network nodes 102-1, 102-2, . . . 102-M implement respective instances of ad-hoc network role identification logic 120-1, 120-2, . . . 120-M (collectively, ad-hoc network role identification logic 120), network node grouping logic 122-1, 122-2, . . . 122-M (collectively, network node grouping logic 122) and network traffic processing logic 124-1, 124-2, . . . 124-M (collectively, network traffic processing logic 124). As noted above, in the ad-hoc network 103, a subset of the network nodes 102 may have connectivity to the external data network 104 (e.g., via a RAN). Such network nodes 102 are referred to herein as "bridging" network nodes in the ad-hoc network 103. These bridging network nodes in the ad-hoc network 103 enable other ones of the network nodes 102 which do no have connectivity to the external data network 104, referred to herein as "constrained" network nodes, to access the application servers 106 or other resources accessible via the external data network 104. The network nodes 102 utilize their respective instances of the ad-hoc network role identification logic 120 to determine whether the network nodes 102 should take on the role of bridging or constrained network nodes in the ad-hoc network 103 (e.g., based on whether the network nodes 102 have connectivity to a RAN). It should be noted that a given one of the network nodes 102 may take on different roles (e.g., bridging vs. constrained) at different times based on whether the given network node 102 currently has connectivity to a RAN for accessing the external data network 104.

The network nodes 102 utilize their respective instances of the network node grouping logic 122 to determine a group of network nodes in the ad-hoc network 103 to which the network nodes 102 belong. Each group of the network nodes 102 includes at least one of the network nodes 102 which has the role of a bridging network node. The bridging network nodes advertise their addresses or other identifiers to other ones of the network nodes 102. Ones of the network nodes acting as constrained network nodes use the network node grouping logic 122 to calculate logical distance to each bridging network node that it has access to (e.g., that is within a specified hop limit for the ad-hoc network 103). The constrained network nodes are grouped according to the calculated logical distance (e.g., with the constrained network nodes joining a group of network nodes based on minimum logical distance to available bridging network nodes).

The network nodes 102 utilize the network traffic processing logic 124 to exchange data with the external data network 104. For ones of the network nodes 102 which are constrained network nodes, the network traffic processing logic 124 is configured to forward data to be exchanged with the external data network 104 via one of the network nodes 102 in its group which is acting as a bridging network node. For ones of the network nodes 102 which are bridging network nodes, the network traffic processing logic 124 is configured to send its own data to the external data network 104, and is also configured to receive data from ones of the network nodes 102 in its group which are acting as constrained network nodes, and to forward such data to the external data network 104.

At least portions of the ad-hoc network role identification logic 120, the network node grouping logic 122 and the network traffic processing logic 124 may be implemented at least in part in the form of software that is stored in memory and executed by a processor.

It is to be appreciated that the particular arrangement of the network nodes 102, the ad-hoc network 103, the external data network 104 and the application servers 106 illustrated in the FIG. 1 embodiment is presented by way of example only, and alternative arrangements can be used in other embodiments. The application servers 106 and other portions of the information processing system 100, as will be described in further detail below, may be part of cloud infrastructure.

The network nodes 102, the application servers 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The network nodes 102 and the application servers 106, or components thereof, may be implemented on respective distinct processing platforms, although numerous other arrangements are possible. The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the network nodes 102 and the application servers 106, or portions or components thereof, to reside in different data centers. Numerous other distributed implementations are possible.

Additional examples of processing platforms utilized to implement the network nodes 102, the application servers 106 and other components of the information processing system 100 in illustrative embodiments will be described in more detail below in conjunction with FIGS. 10 and 11.

It is to be appreciated that these and other features of illustrative embodiments are presented by way of example only, and should not be construed as limiting in any way.

It is to be understood that the particular set of elements shown in FIG. 1 for exchanging data traffic between network nodes in a D2D communication network and an external data network is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for exchanging data traffic between network nodes in a D2D communication network and an external data network will now be described in more detail with reference to the flow diagram of FIG. 2. It is to be understood that this particular process is only an example, and that additional or alternative processes for exchanging data traffic between network nodes in a D2D communication network and an external data network may be used in other embodiments.

In this embodiment, the process includes steps 200 through 208. These steps are assumed to be performed by the network nodes 102 using the ad-hoc network role identification logic 120, the network node grouping logic 122, and the network traffic processing logic 124. The FIG. 2 process begins with step 200, generating, for a given one of a plurality of network nodes in a D2D communication network, a link-local network address for communications in the D2D communication network. The link-local network address is generated based at least in part on a unique identifier associated with the given network node. The D2D communication network may comprise a V2V communication network, and the given network node may comprise a vehicle in the V2V communication network. The unique identifier associated with the given network node may comprise a Vehicle Identification Number (VIN), a license plate number, a Media Access Control (MAC) address, combinations thereof, etc. The link-local network address may be generated in step 200 utilizing Stateless Address Auto Configuration (SLAAC). The link-local network address generated for the given network node in step 200 may be broadcast to one or more other ones of the plurality of network nodes in the D2D communication network. The given network node may also be configured to obtain link-local network addresses generated for one or more other ones of the plurality of network nodes in the D2D communication network.

At least one measure of RAN signal strength for the given network node for at least one corresponding RAN is determined in step 202. The corresponding RAN comprises one or more RAN base stations facilitating access to a data network external to the D2D communication network. Responsive to the at least one measure of the RAN signal strength being above a designated signal strength threshold, a first communication role in the D2D communication network is assigned to the given network node in step 204. Responsive to the at least one measure of the RAN signal strength being at or below the designated signal strength threshold, a second communication role in the D2D communication network, different than the first communication role in the D2D communication network, is assigned to the given network node in step 206. Data traffic is exchanged between the given network node and the external data network in step 208 based at least in part on which of the first communication role in the D2D communication network and the second communication role in the D2D communication network is assigned to the given network node.

Responsive to assigning the first communication role in the D2D communication network to the given network node, the data traffic for the given network node is exchanged with the external data network via at least one of the one or more RAN base stations. Responsive to assigning the first communication role in the D2D communication network to the given network node, the FIG. 2 process may further include forwarding data traffic for one or more other ones of the plurality of network nodes assigned the second communication role in the D2D communication network to the external data network via the given network node and at least one of the one or more RAN base stations.

Responsive to assigning the second communication role in the D2D communication network to the given network node, the FIG. 2 process may further include: determining a logical distance between (i) the link-local network address generated for the given network node and (ii) link-local network addresses generated for one or more other ones of the plurality of network nodes assigned the first communication role in the D2D communication network; selecting one of the one or more other ones of the plurality of network nodes assigned the first communication role in the D2D communication network based at least in part on the determined logical distance; and forwarding data traffic for the given network node to the external data network via the selected one of the one or more other ones of the plurality of network nodes assigned the first communication role in the D2D communication network. The logical distance between the given network node and a given one of the one or more other ones of the plurality of network nodes assigned the first communication role in the D2D communication network may be determined based at least in part on a difference between a group number of the given network node and a group number of the given other network node, wherein the group numbers of the given network node and the given other network node comprise a subset of digits of the link-local network addresses generated for the given network node and the given other network node. The subset of digits of the link-local network addresses generated for the given network node and the given other network node may comprise a last two hexadecimal digits of the link-local network addresses generated for the given network node and the given other network node. Selecting one of the one or more other ones of the plurality of network nodes assigned the first communication role in the D2D communication network may be further based at least in part on a number of hops between the given network node and each of the one or more other ones of the plurality of network nodes assigned the first communication role in the D2D communication network.

V2V communication is a branch of D2D communications. V2V communication allows vehicles to send and receive omni-directional messages through communication interfaces between them. Beyond uplink and downlink, the 3rd Generation Partnership Project (3GPP) cellular communication standard association has defined a sidelink (e.g., the PC5 interface) to improve communication performance and regulate traffic relay between network nodes (e.g., vehicles) that are part of a Long Term Evolution Vehicle-to-Everything (LTE-V2X) network. The LTE-V2X network may be associated with the 5G Automotive Association (5GAA). The PC5 interface can utilize a management profile provided by a radio base station (e.g., gNB), and link vehicles without the coverage of a RAN. The PC5 interface can provide various functions, such as functions for supporting sidelink broadcast, groupcast and unicast transmissions for various scenarios, including (1) inside-RAN coverage, (2) out-of-RAN coverage, and (3) partial RAN coverage.

Figure 3A:
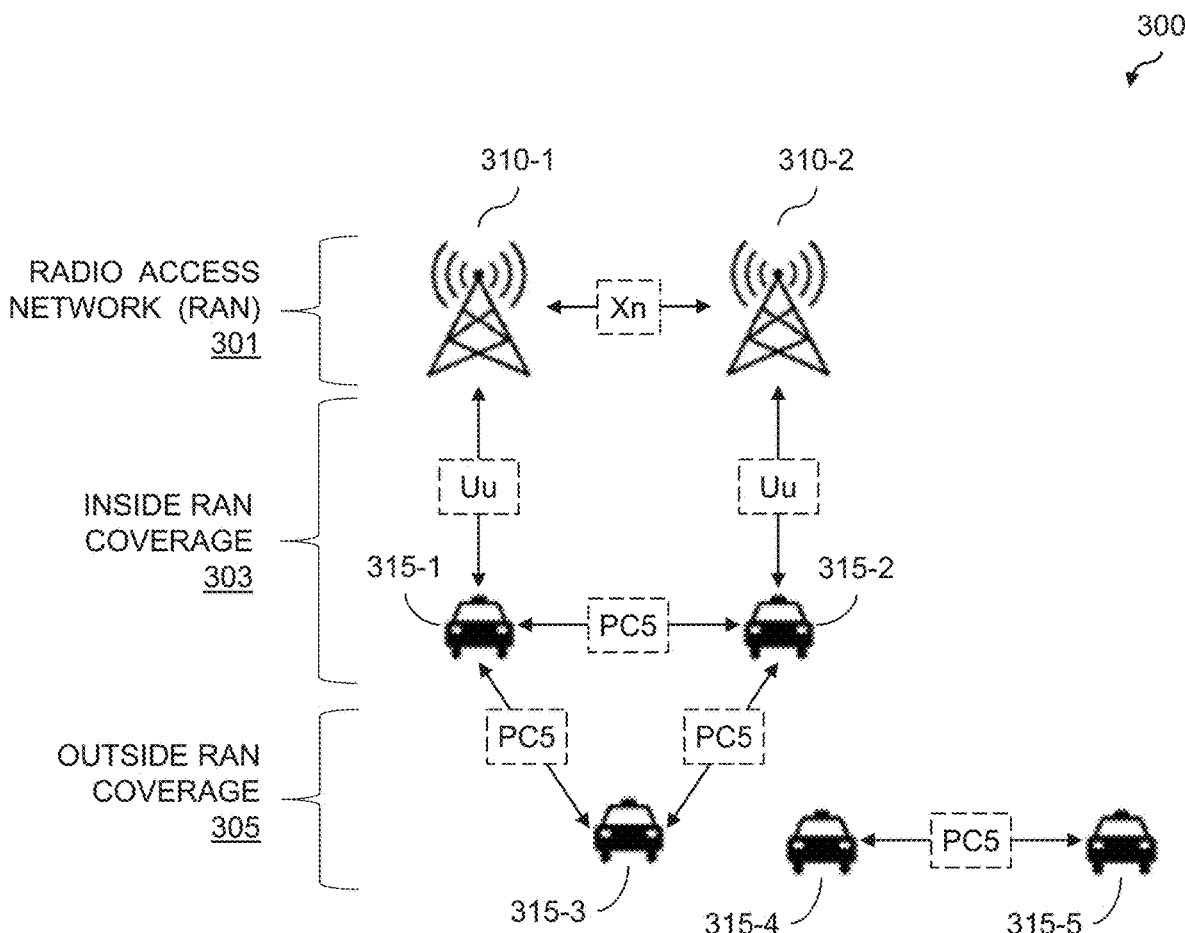

FIG. 3A shows a system 300 illustrating V2X interfaces defined by 3GPP. The system 300 includes a RAN 301 with two radio base stations 310-1 and 310-2 (collectively, radio base stations 310) and a set of network nodes 315-1, 315-2, 315-3, 315-4 and 315-5 (collectively, network nodes 315). The network nodes 315 may comprise, for example, vehicles in an LTE-VTX network. As illustrated in FIG. 3A, the network nodes 315-1 and 315-2 are inside RAN coverage 303 (e.g., within a range of the radio base stations 310 of the RAN 301) while the network nodes 315-3, 315-4 and 315-5 are outside RAN coverage 305 (e.g., outside of a range of the radio base stations 310 of the RAN 301). The radio base stations 310-1 and 310-2 are connected via an Xn network interface. The network nodes 315-1 and 315-2 which are inside RAN coverage 303 are connected to the radio base stations 310-1 and 310-2 via respective Universal Mobile Telecommunication System (UMTS) Air Interfaces (Uu). The network nodes 315 are also connected to one another, both inside RAN coverage 303 and outside RAN coverage 305, via respective PC5 interfaces as shown.

Figure 3B:
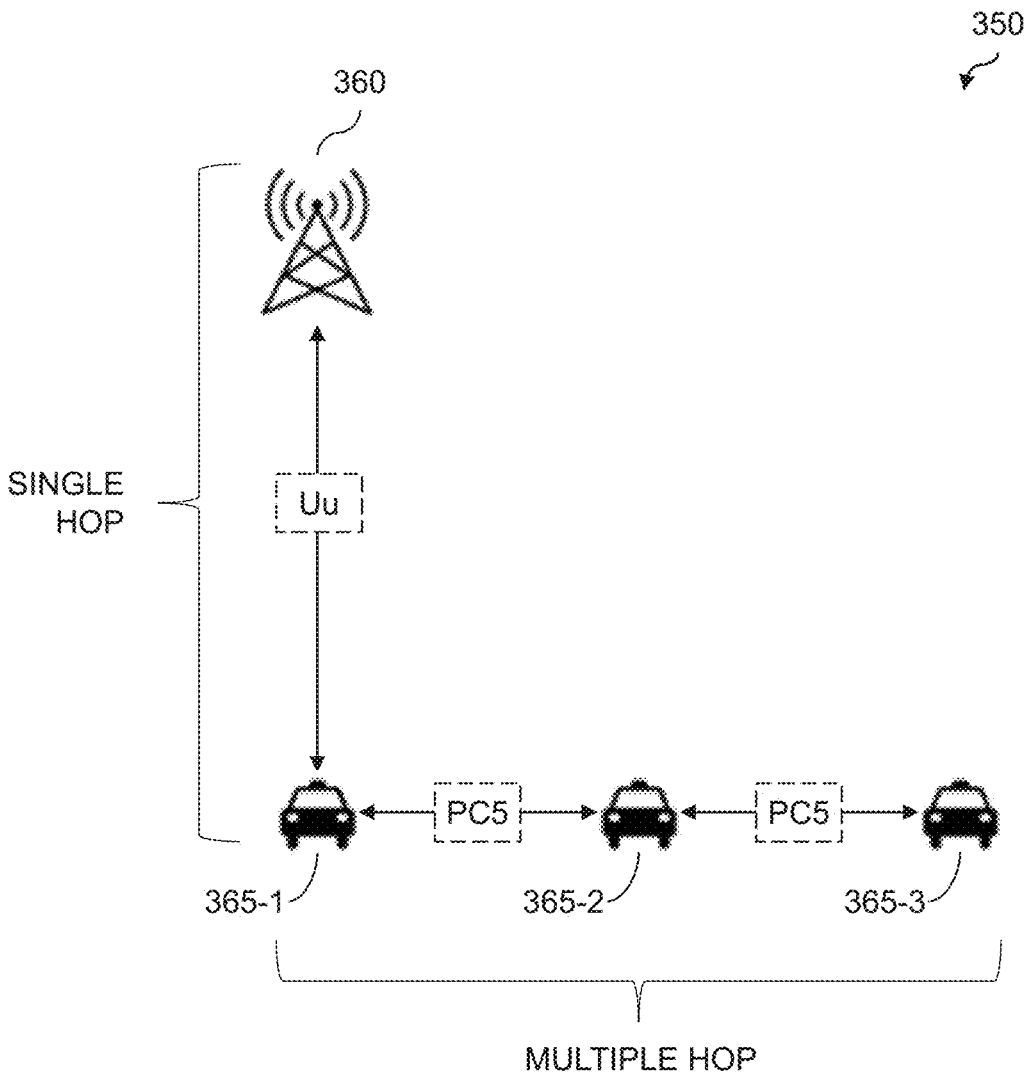

FIG. 3B shows a system 350 illustrating a multi-hop V2V network. The system 350 includes a radio base station 360 and a set of network nodes 365-1, 365-2 and 365-3 (collectively, network nodes 365). The network nodes 365 may comprise, for example, vehicles in an LTE-VTX network. The network node 365-1 is connected to the radio base station 360 via a Uu interface with a single hop. The network nodes 365-2 and 365-3 are connected to the radio base station 360 via multiple hops (e.g., with PC5 interfaces interconnecting the network nodes 365-2 and 365-3 to the network node 365-1, and the network node 365-1 being connected to the radio base station 360 via the Uu interface).

FIG. 3C shows a plot 375, illustrating a motorway scenario and LTE-V2X V2V performance for network nodes (e.g., vehicles) traveling along highways at different speeds (e.g., 100 kilometers per hour (km/h), 110 km/h, 120 km/h, 130 km/h and 140 km/h). The plot 375 shows packet reception ratio (PRR) as a function of distance for the network nodes traveling along highways at the different speeds. For out-of-RAN coverage cases, network nodes exchange data directly through the sidelinks (e.g., PC5 interfaces) between one another. Under a no-RAN-signal environment, within 100 to 200 meters, data traffic can be considered reliable as shown in the plot 375 of FIG. 3C. However, for communication with data sources that are out of an internal ad-hoc network, the balance of traffic presents challenges.

Today, vehicles are relying more frequently on network connections with infrastructure at edge computing sites (e.g., where the edge computing sites comprise computing facilities that are close to roadside scenarios). This is due, in part, to vehicle systems which generate various sensory data and which consume information that has been associated with the sensory and other relevant data. Signal strength, however, is weakened by buildings in some areas (e.g., in tunnels, under bridges, etc.). Although data can be exchanged inside an internal ad-hoc network between vehicles, handling communication with external data sources (e.g., external application servers) may be limited to a small number of vehicles or other network nodes. No matter what routing algorithm is used, there is a need for technical solutions for pairing constrained network nodes with bridging network nodes that can forward requests to an external data network. With limited bridging network nodes in a vehicle network, there is a need for technical solutions that can balance groups of vehicles within the vehicle network.

Illustrative embodiments provide technical solutions for extending and balancing a V2V network, to enable delivery of data with high availability. It should be noted that while various embodiments are described with respect to a V2V network, the technical solutions may be more generally applied to any type of D2D network where devices or network nodes communicate with one another via an internal ad-hoc network, and which also communicate data outside the internal ad-hoc network to an external data network (e.g., with application servers or other resources in the external data network). The technical solutions described herein provide functionality for creating a V2V sidelink network. In some embodiments, a multi-hop V2V network is created that can form collaboration groups of vehicles or other network nodes, so that the multi-hop V2V network will have a connection channel (e.g., via one or more of the vehicles or network nodes within the collaboration group acting as bridging network nodes) to an external network (e.g., the Internet).

The technical solutions also provide functionality for assigning unique network addresses (e.g., Internet Protocol (IP) addresses) in the V2V network. In some embodiments, IP version 6 (IPv6) features are leveraged to create globally unique addresses for routing messages. This skips an IP address assignment process, which saves time for data exchange operations. The technical solutions further provide functionality for balancing the number of vehicles or other network nodes which are within different collaboration groups of a V2V network when possible. In some embodiments, the technical solutions identify one or more key "bridging" vehicles or network nodes which have a connection to the RAN which will forward traffic to the RAN from other "constrained" vehicles or network nodes (e.g., which do not have a direct connection to the RAN, or which have poor signal strength for a direction connection to the RAN, etc.). This helps to balance the number of network nodes in different collaboration groups in the V2V network as well as balancing access to the external data network (e.g., the Internet).

Cellular V2X (C-V2X) is a 3GPP standard for V2X applications such as self-driving cars. It is an alternative to Dedicated Short-Range Communications (DSRC) such as 802.11p, the Institute of Electrical and Electronics Engineers (IEEE) specified standard for V2V and other forms of V2X communications. C-V2X uses 3GPP standardized 4G LTE or 5G mobile cellular connectivity to exchange messages between vehicles, pedestrians and wayside traffic control devices such as traffic signals. C-V2X commonly uses the 5.9 gigahertz (GHz) frequency band, which is the officially designated Intelligent Transport System (ITS) frequency in most countries. C-V2X can function without network assistance, and exceeds the range of DSRC by about 25%. C-V2X was developed within the 3GPP to replace DSRC in the United States and Cooperative ITS (C-ITS) in Europe.

Vehicles have become moving workstations, with functions for processing local computation and networking. Beyond that, the interaction between vehicles and surrounding infrastructure extends the capability of the vehicles to support ITS use cases such as safety warning distribution. However, the moving nature of vehicles and the roadside situation constraints bring various technical problems including challenges related to dynamic topology, roadside signal blockage, and traffic balancing. The topology of a V2V network is dynamic, and thus the network address or other identifier (ID) assignment should not rely on a stateful "control node." Thus, vehicles need a predefined and unique address or name in order to be identified by other nodes in the V2V network. With roadside constraints, only a limited number of nodes may connect to access points (e.g., radio base stations) or other infrastructures. Such nodes act as "bridges" between the V2V network and access points or other infrastructures. Large amounts of traffic of the V2V network may go to the limited number of bridging network nodes, which may slow down performance of the V2V network. In RAN signal constrained areas, hop-count-based routing or Quality of Service (QoS) based algorithms may choose less hop connections or better QoS. This may either increase the data processing of bridging network nodes in high density areas, or take time to measure the QoS (which, because of the dynamic nature of the V2V network, is difficult). The technical solutions described herein overcome these and other technical challenges by providing methods which do not rely on any negotiation in advance to establish a balanced V2V multi-hop network that extends the traffic of an external data network (e.g., the Internet) to vehicles which are constrained and not able to reach the external data network directly.

A V2V stateless multi-hop scenario will now be described. A stateful multi-hop network means that somewhere in the network a managing network node keeps the state of the network, so as to assign addresses for routing or other purposes. For example, in a network that includes vehicles, one or more of the vehicles may be selected as a "managing" network node to perform Dynamic Host Configuration Protocol (DHCP) and other networking functionalities. On the contrary, a stateless multi-hop network with agreed identity uniqueness guarantee can make communications without a managing network node that assigns identities (e.g., network addresses) or other forms of tokens for network routing.

For the V2V case, a stateful network has many good features if the network topology is stable or the access to the managing network node (e.g., a state server) is reliable. The stateful network, however, requires member network nodes to communicate with the controlling or managing network node. Usually, this make take multiple steps and time to negotiate. For the vehicle case, however, the topology of the V2V multi-hop network may be dynamic and the topology may not be stable enough. In a larger scale, a regional edge node in a data network (e.g., the Internet) may help to keep state. In many real-world use case scenarios, however, the signal of the access network is limited. Thus, a stateless solution is preferred for keeping communication efficient.

IPv6 Stateless Address Auto Configuration (SLAAC), defined by the Internet Engineering Task Force (IETF) Request For Comments (RFC) 4862, requires no manual configuration of hosts, minimal (if any) configuration of routers, and no additional servers. An advantage of SLAAC is that it is easy to manage, and can realize IPv6 plug and play features. The stateless mechanism enables a host (e.g., a vehicle in the V2V case) to generate its own IP address by using local information, as well as non-local information that is advertised by routers if needed or desired. In the absence of routers, a host can generate only link-local addresses in a same link. The link-local addresses may be generated through an Extended Unique Identifier (EUI-64) equivalent algorithm which can obtain an IP address from a target code. If the uniqueness of the target code can be guaranteed (e.g., such as where Media Access Control (MAC) addresses are used as the target codes), then the resulting IP address is unique. According to IETF RFC 2462, in the case of addresses created through stateless autoconfiguration, the uniqueness of an address is determined primarily by the portion of the address formed from an interface identifier. If a node has already verified the uniqueness of a link-local address, additional addresses created from the same interface identifier need not be tested one by one.

Communication in V2V networks suffer from various technical problems and challenges, including that radio signals may be blocked or lost in some areas. Conventional approaches may rely on having good network coverage of an infrastructure. For example, cellular network solutions may be adopted for V2X communication. Thus, in poor cellular signal coverage areas (e.g., the middle of a tunnel, under a bridge, remote areas, etc.) vehicles and other network nodes may rely on multi-paths (e.g., if there is another packet exit available), multi-hop communication (e.g., if there are other vehicles or network nodes available to extend the connection), combinations thereof, etc. in order to exchange data in areas with poor network coverage. Further, in a V2V network, the network of vehicles may change because any number of vehicles may join or leave the network, and thus network state information may be lost. The topology of the V2V network is thus dynamic, and the network address or other ID assignment may not rely on a stateful control or management network node. Vehicles may thus need predefined and unique addresses or names in order to be identified by other network nodes in the dynamic network topology.

In addition, unbalanced grouping of network nodes may waste potential network resources and increase latency. In each group of network nodes within a V2V network, there may be one or more bridging network nodes configured to handle communication between other network nodes (e.g., vehicles) and a RAN providing access to an external data network. Unbalanced grouping means that most of the network nodes may connect to a single bridging network node, while there may be other bridging network nodes available and reachable. This can cause the single bridging network node to be a bottleneck, wasting the connections and potential resources of other bridging network nodes. Unbalanced grouping may be caused by various reasons, including that there is unbalanced vehicle or other network node density in a small area, where the vehicles or other network nodes may race for choosing a better signal or shorter distance connection. However, when an area is a weak signal area and the connection to the RAN is under constraint, only a few network nodes have the capability to forward data between the V2V network and the RAN. Thus, it is very easy for the bridging network nodes to become bottlenecks in the V2V network. Network node racing for choosing a better signal or shorter distance connection may improve connection quality if the signal strength is good and the number of connections are adequate. In scenarios where there is a weak signal area and/or relatively few bridging network nodes, it is necessary to balance the number of connections to make the whole network work properly. With roadside constraints, only a few network nodes may connect to access points or other infrastructures. Thus, some of the network nodes (e.g., vehicles) may act as the bridge between the V2V network and the infrastructure, with traffic from other network nodes going through the relatively few bridging network nodes which may slow down the overall performance of the network. According to Little's law, if the arrival rate exceeds the exit rate this would represent an unstable system where the number of waiting packets would gradually increase towards infinity. This may result in packet loss.

Figure 4:
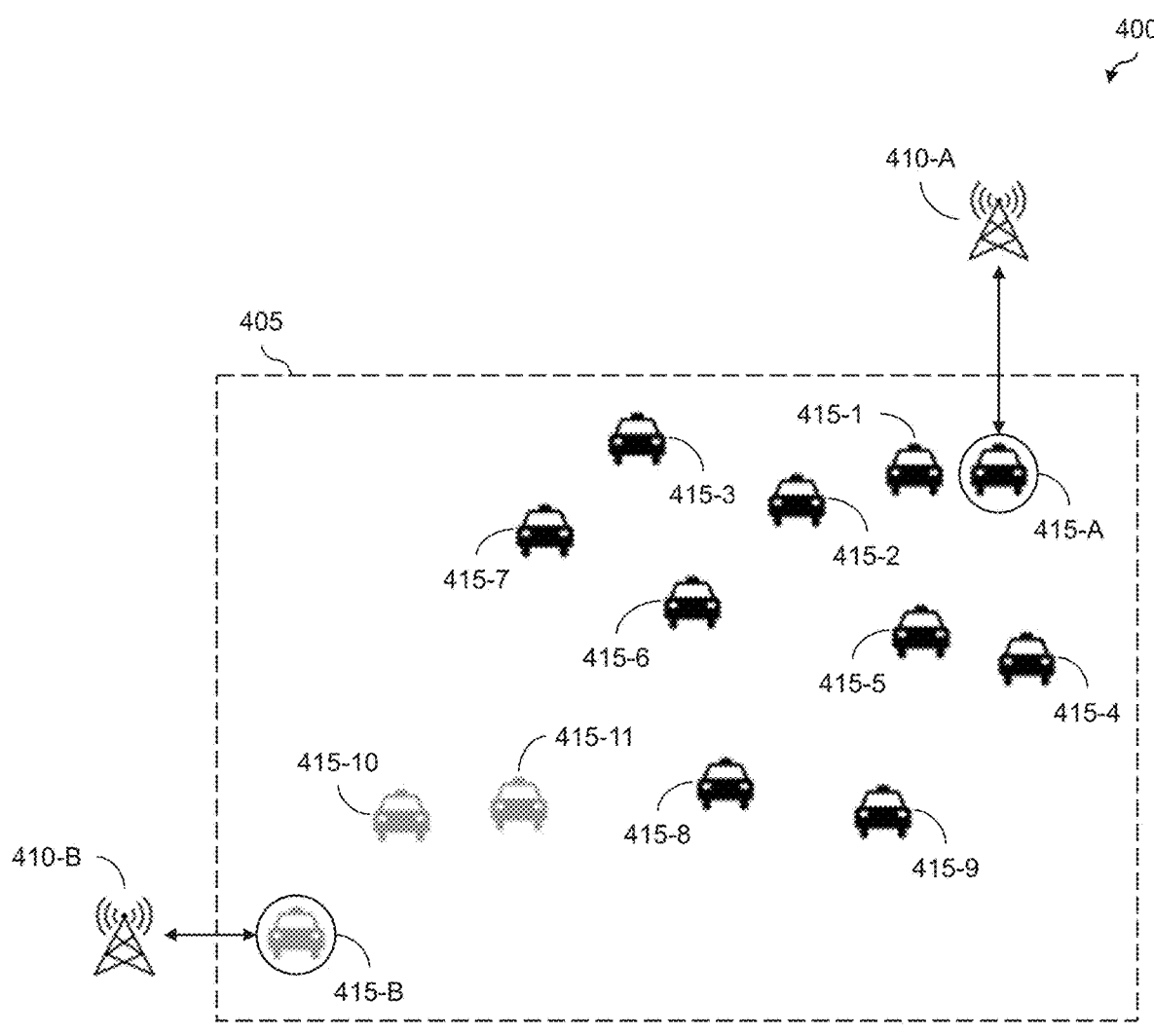
FIG. 4 shows network nodes in a radio access network constrained coverage area of a device-to-device network in an illustrative embodiment.

FIG. 4 shows a system 400 including a V2V network area 405 with a connection restraint. The system 400 includes two radio base stations 410-A and 410-B (collectively, radio base stations 410). In the V2V network area 405, there are two "bridging" network nodes 415-A and 415-B which have a connection with the radio base stations 410-A and 410-B, respectively. Other "constrained" network nodes 415-1 through 415-11 (collectively, constrained network nodes 415) access the RAN through one of the bridging network nodes 415-A and 415-B. In the FIG. 4 example, the constrained network nodes 415-1 through 415-9 (shaded black) connect via the bridging network node 415-A while the constrained network nodes 415-10 and 415-11 (shaded gray) connect via the bridging network node 415-B. Various routing algorithms may be used to select which of the constrained network nodes 415 connect to which of the bridging network nodes 415-A and 415-B, including routing algorithms which consider distance or hop count over network balance. Thus, as shown in the system 400 of FIG. 4, more of the constrained network nodes 415 connect via the bridging network node 415-A than the bridging network node 415-B. This may result in the bridging network node 415-A becoming a bottleneck. Routing algorithms which consider distance or hop count over network balance include, for example, Dynamic Source Routing (DSR), Ad-Hoc On-Demand Distance Vector (AODV), Temporally Ordered Routing Algorithm (TORA), etc. Some routing algorithms are also stateful. These algorithms solve data delivery in open, fully-connected environments. However, for a vehicle which is not a dedicated network device configured for handling huge amounts of data, it is still easy for one or a few vehicles to become bottlenecks of a whole V2V network. In the system 400 of FIG. 4, for example, most of the constrained network nodes 415 use the bridging network node 415-A for data forwarding, while the capability of the bridging network node 415-B is not fully leveraged.

Figure 5:
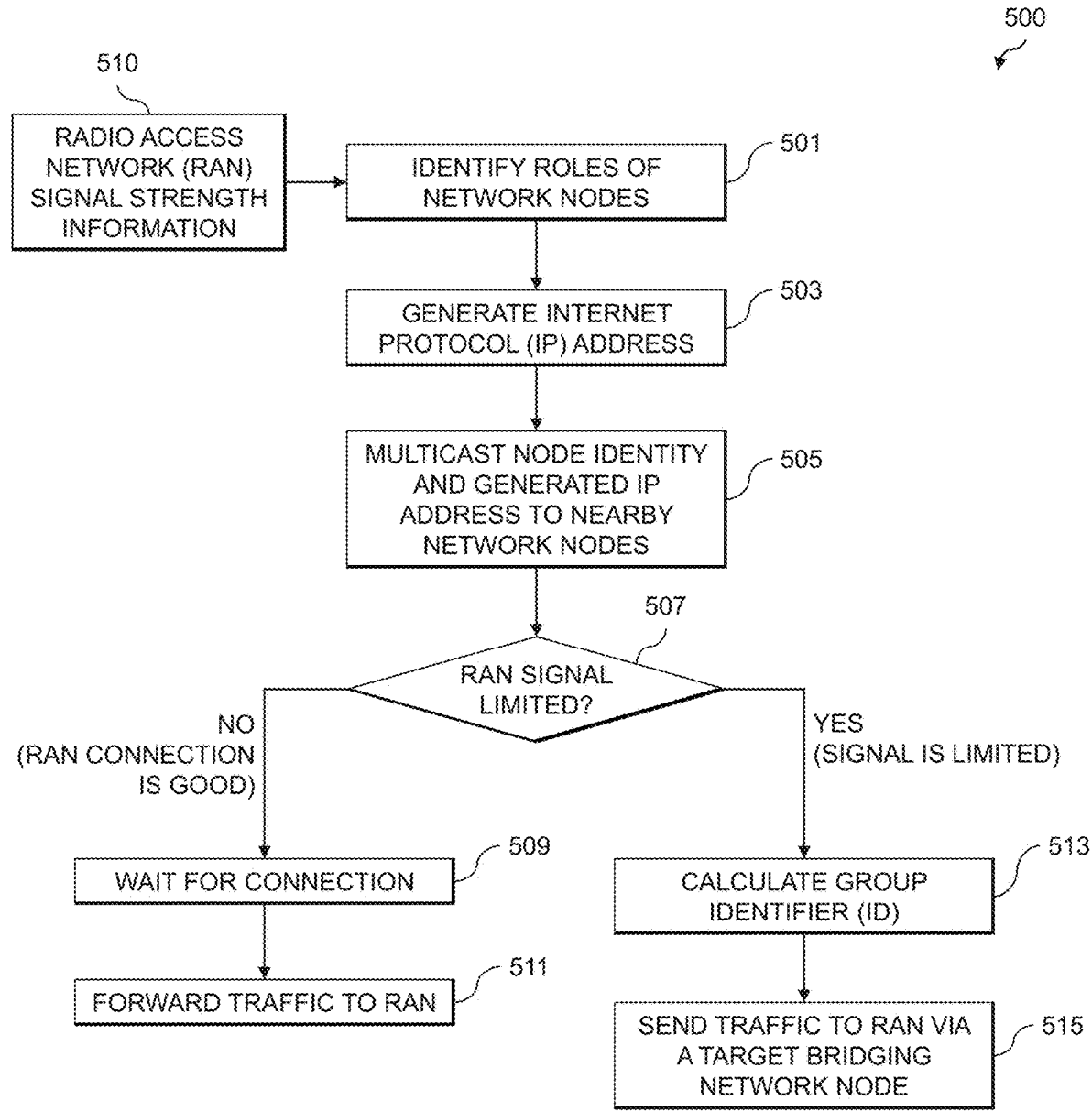
FIG. 5 shows a process flow for traffic management in a radio access network constrained coverage area of a device-to-device network in an illustrative embodiment.

Illustrative embodiments provide technical solutions for balancing data traffic between a V2V/D2D network and an external data network without requiring negotiation that spends extra time in control flows. Some embodiments leverage IPv6 SLAAC, so that Internet data can be extended in a stateless manner to those in-moving vehicles of a V2V network that are not covered by radio signals through other vehicles in the V2V network that do have radio signal coverage (e.g., cellular, WiFi, etc.). FIG. 5 shows a process flow 500 for traffic management in a V2V or other D2D network, which begins in step 501 with identifying the roles of network nodes (e.g., vehicles) in the V2V or other D2D network. The roles may be, for example, "bridging" and "constrained" network nodes. The roles may be identified in step 501 based on RAN signal strength information 510. When step 501 is triggered, a network node identifies the strength of its RAN signal using the RAN signal strength information 510. If the RAN signal is good (e.g., its signal strength exceeds some designated threshold), then that network node may act as a bridging network node between the V2V or other D2D network and an external data network. Otherwise, the network node is a constrained network node which is only able to connect to other network nodes within the V2V or other D2D network, and must find one of such other network nodes which is a bridging network node (e.g., directly, or via multiple hops) in order to reach the external data network.

In step 503, IP addresses are generated for the network nodes. In some embodiments, IPv6 SLAAC is applied in the V2V or other D2D network, such that network nodes in the V2V or other D2D network can use a global unique identity (e.g., MAC or an equivalent identity) to generate an ad-hoc local link in IPv6. Within a hop limit and using bridging network nodes (e.g., vehicles or other network nodes which have direct connections to a RAN providing access to the external data network), the V2V or other D2D network can exchange data with the external data network. Stateless addressing advantageously saves time for confirming addresses back and forth. After the addresses are generated in step 503, network node identities and generated IP addresses may be multicasted to nearby network nodes in step 505. For example, the bridging network nodes may initiate multicast to nearby network nodes, notifying the V2V or other D2D network that the bridging network nodes can provide access to the external data network. Constrained network nodes may continue multicasting of the address of the bridging network nodes message within an associated hop limit.

Once a vehicle or other network node in the V2V or other D2D network wants to request resources from the external data network, a determination is made in step 507 as to whether that network node has a limited RAN signal (e.g., whether it is a bridging or constrained network node). If the result of the step 507 determination is no (e.g., that the RAN connection is good and the network node is not a constrained network node), the network node in step 509 will wait for a connection to the RAN and in step 511 will forward traffic to the RAN. If the result of the step 507 determination is yes (e.g., that the RAN signal is limited and the network node is constrained), then a group ID is calculated in step 513 and the constrained network node sends traffic to the RAN in step 515 via a target bridging network node for the calculated group ID. With the bridging network node addresses having been multicast in step 505, constrained network nodes can find suitable bridging network nodes using an appropriate routing algorithm (e.g., DSR, AODV, etc.). After establishment of the V2V or other D2D network when there are several candidate bridging network nodes, for balancing the number of data requests across the candidate bridging network nodes, a requestor constrained network node may calculate a logical distance between its own address and the addresses of the candidate bridging nodes, and then connect to the bridging network node with the minimal logical distance as the target destination. Advantageously, this process does not rely on any stateful data.

Figure 6A:
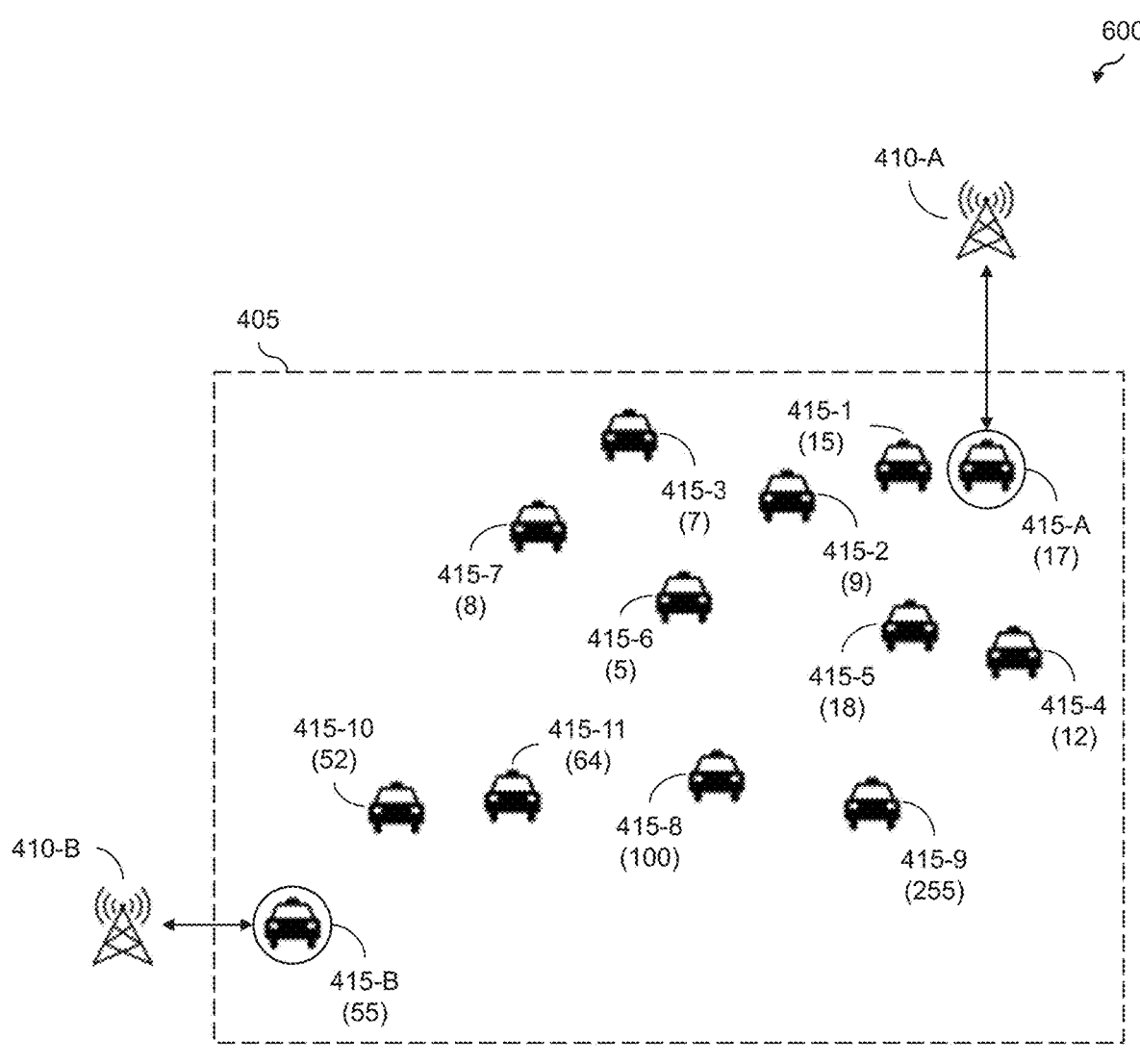
FIGS. 6A-6C shows assignment of identifiers and roles to network nodes in a radio access network constrained coverage area of a device-to-device network in an illustrative embodiment.
Figures 6B, 6C:
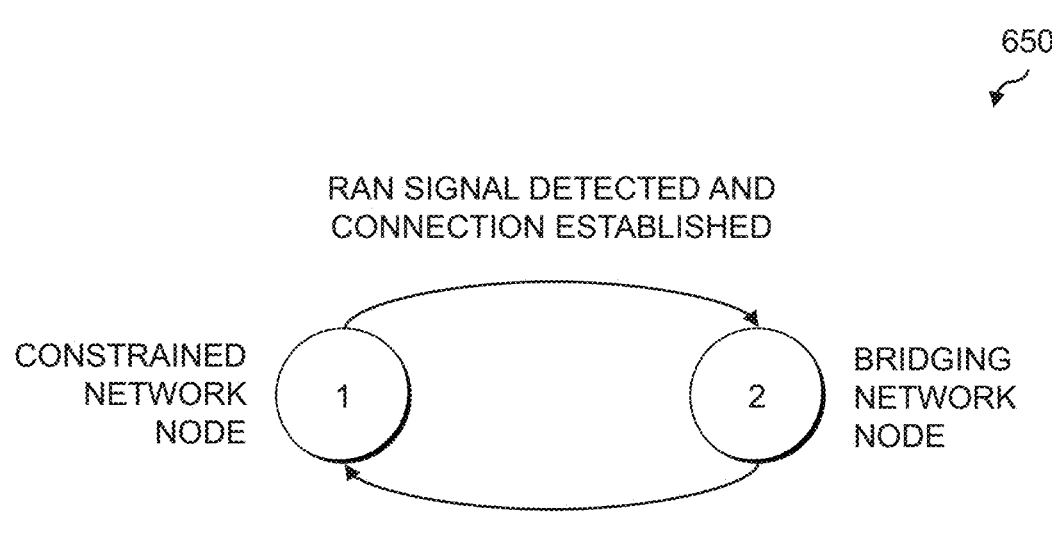

Role identification will now be described in further detail with respect to FIGS. 6A and 6B. FIG. 6A shows a system 600, which includes the V2V network area 405 with the connection restraint, the two radio base stations 410, the two bridging network nodes 415-A and 415-B, and the constrained network nodes 415 similar to the system 400 of FIG. 4. Here, each of the bridging network nodes 415-A and 415-B along with the constrained network nodes 415 is assigned a number for later node grouping. For example, the bridging network node 415-A is assigned number 17, the bridging network node 415-B is assigned number 55, the constrained network node 415-1 is assigned number 15, the constrained network node 415-2 is assigned number 9, etc. The assigned numbers may be derived from a number that is evenly distributed in a wide range (e.g., IP address, Vehicle Identification Number (VIN), another reasonable code, etc.). Based on the location and role, two classes of the network nodes are defined: the bridging network nodes 415-A and 415-B which bridge the V2V network area 405 with the radio base stations 410-A and 410-B, respectively; and the constrained network nodes 415 which only reach other network nodes within the V2V network area 405.

Bridging network nodes are the network nodes which receive a signal of a RAN, and act as a bridge to exchange data between the V2V or other D2D network and an external data network (e.g., the Internet) accessible via the RAN. Constrained network nodes are the network nodes that receive no RAN signal and only receive signals from the V2V or other D2D network. With the RAN signal availability, network nodes may switch between the two roles as illustrated in FIG. 6B. FIG. 6B shows a state diagram 650 with the two roles, with the constrained role denoted "1" and the bridging role denoted "2." When a constrained network node detects a RAN signal and establishes a RAN connection, it transitions to being a bridging network node. When a bridging network node has its RAN signal disconnected, it transitions to being a constrained network node. The table 675 of FIG. 6C shows the status and activity transitions between the constrained and bridging roles. Network nodes status or state 1 (e.g., constrained network nodes) are ad-hoc network normal nodes. When a RAN signal is detected by a network node in state 1, it transitions to state 2 (e.g., bridging network nodes). When a RAN signal is disconnected for a network node in state 2, it transitions to state 1.

Figure 7:
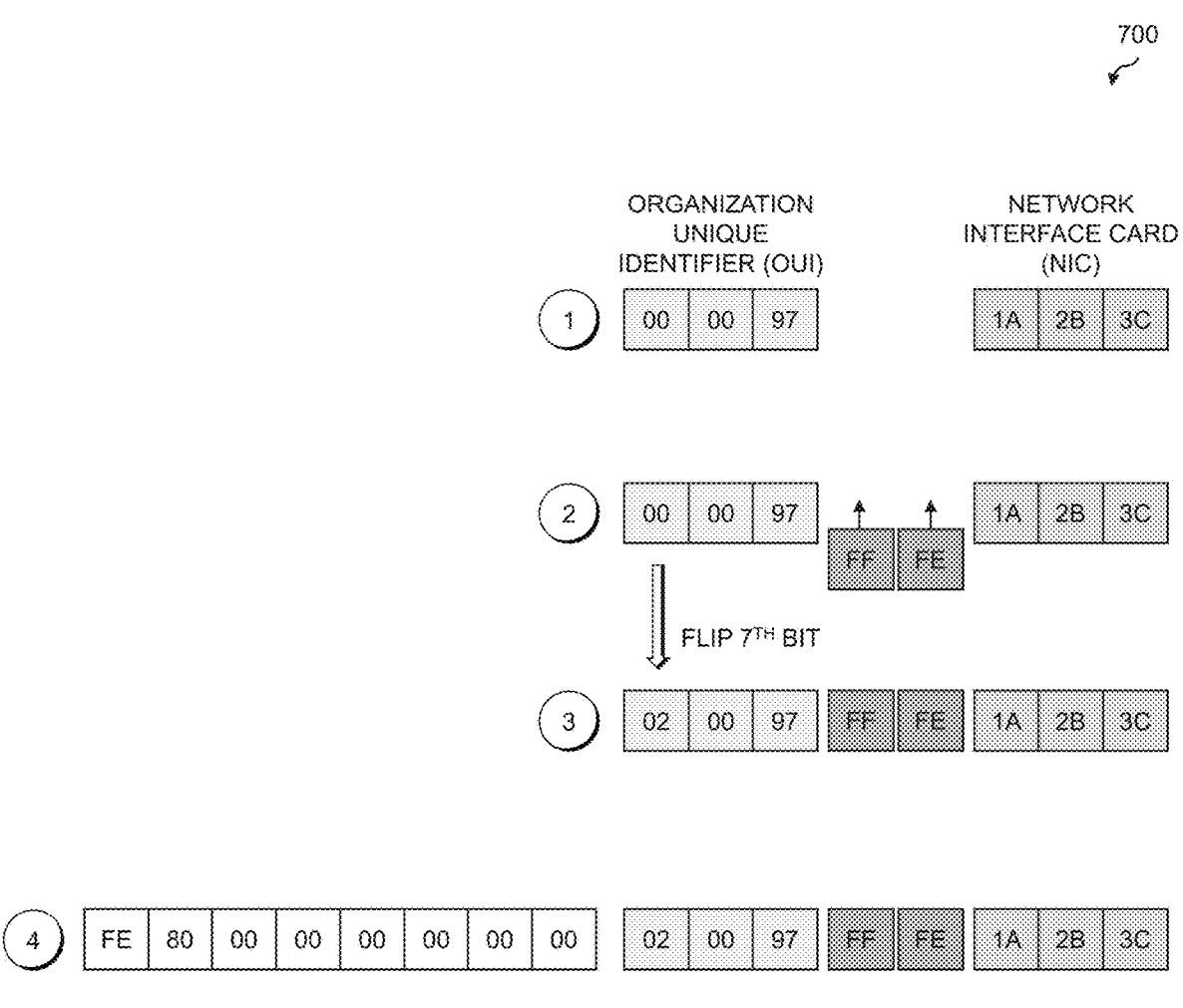
FIG. 7 shows a process for generating an identifier for a network node in a device-to-device network in an illustrative embodiment.

Addressing and multicasting will now be described. With a network node having an address generated through an EUI-64 equivalent algorithm, the V2V or other D2D network can assure that the generated IP or other address is unique. The bridging network node's IPv6 address is able to be notified to all other network nodes within an applicable hop limit, so that the constrained network nodes can use that address to reach back to the bridging network node. FIG. 7 shows an example of a MAC to IPv6 conversion process 700. In step 1, the MAC is split into 2-24 bits, with one being an Organization Unique Identifier (OUI) and the other being Network Interface Card (NIC) specific. In step 2, a reserved value FFFE is inserted between the OUI and the NIC specific values. In step 3, the Universal/Local bit (e.g., the 7th bit from the left) is set to 1 to represent global unique. In step 4, the IPv6 link-local prefix FE80 is added to represent a link-local address. Through the multi-case address FE02::1 in IPv6, the bridging network node is able to reach and spread its own address out to all network nodes in the link local network within an applicable hop limit. With the flag that represents a bridging network node notification message in payload, the constrained network nodes are able to know the available bridging network nodes. The constrained network nodes may also keep forwarding the bridging network node identification message to nearby network nodes (minus the hop limit by 1). Constrained network nodes may receive multiple bridging network node identification messages, if there are multiple bridging network nodes in the V2V or other D2D network within the hop limit.

Figure 8:
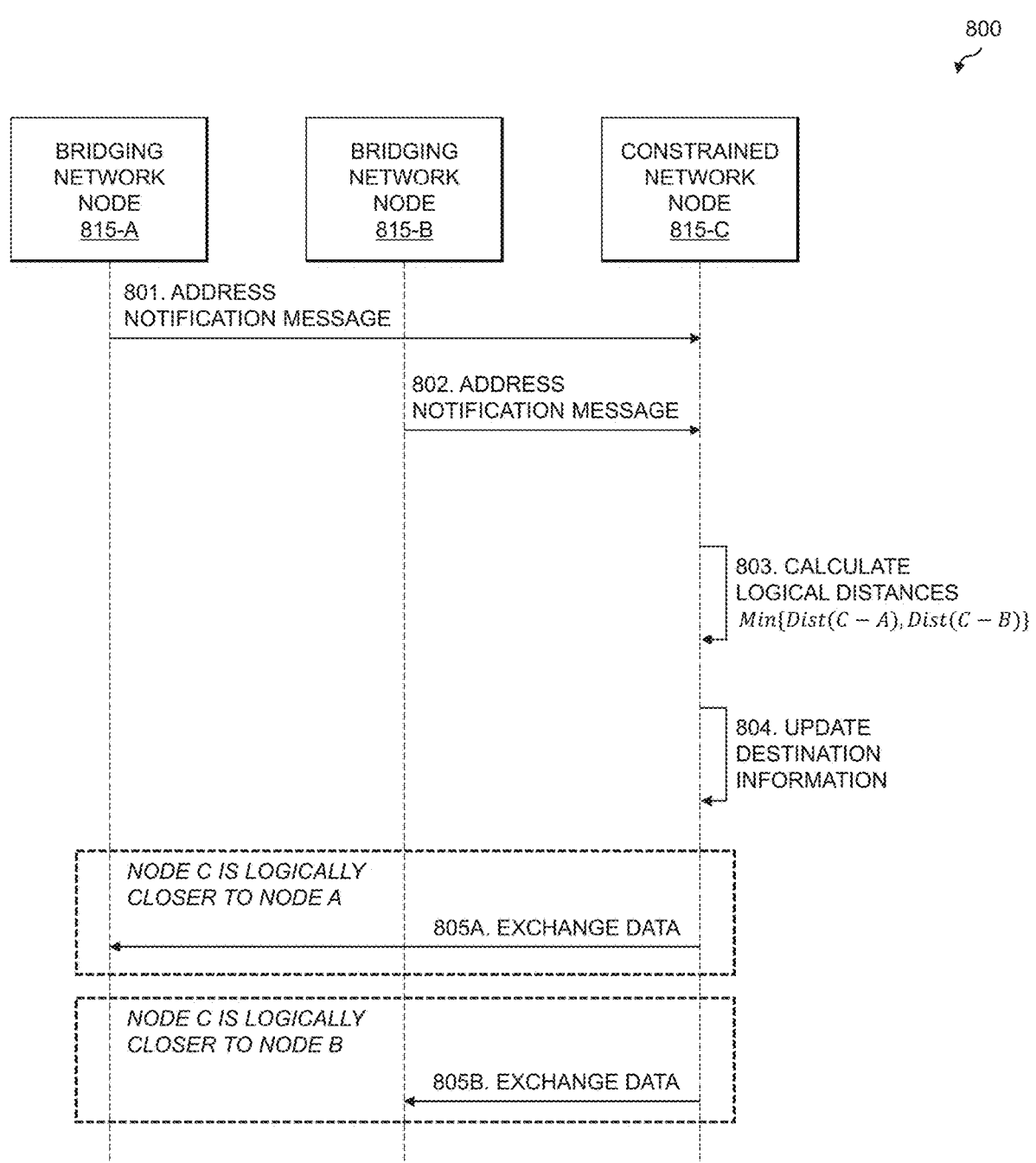
FIG. 8 shows a process flow for selecting a bridging network node for forwarding network traffic from a constrained network node in a radio access network constrained coverage area of a device-to-device network in an illustrative embodiment.

Grouping of network nodes will now be described. For distributing network traffic without negotiation, each network node (e.g., each vehicle in a V2V network) will be assigned to a group that includes at least one bridging network node. This is illustrated by the process flow 800 of FIG. 8, which shows messages exchanged between a bridging network node 815-A, a bridging network node 815-B, and a normal or constrained network node 815-C. In steps 801 and 802, the bridging network nodes 815-A and 815-B send respective address notification messages to the constrained network node 815-C. In step 803, the constrained network node 815-C calculates logical distances between itself and each of the bridging network nodes 815-A and 815-B, such as using the equation: Min{Dist(C–A), Dist(C–B)}. In step 804, the constrained network node 815-C updates destination information. If the constrained network node 815-C is logically closer to bridging network node 815-A than bridging network node 815-B, then in step 805A the constrained network node 815-C exchanges data with the bridging network node 815-A. If the constrained network node 815-C is logically closer to bridging network node 815-B than bridging network node 815-A, then in step 805B the constrained network node 815-C exchanges data with the bridging network node 815-B.

On receiving the bridging node address notification messages, each constrained network node may calculate its logical distance with the available bridging network nodes, if there are multiple bridging network nodes available in the V2V or other D2D network. It should be noted that the logical distance is not a physical distance between network nodes. Instead, the logical distance is the distance between ID numbers of the network nodes. Each of the network nodes, for example, may use the last 2 hex digits to represent its own grouping number. Through subtracting the local grouping number from the received grouping numbers of the bridging network nodes, a constrained network node may determine the logical distance between itself and the potential target bridging network nodes. From the available bridging network nodes, the constrained network nodes may choose the bridging network node with the minimum logical distance. If some of the bridging network nodes share a same grouping number, then a constrained network node may choose the less hop limited bridging network node to connect with.

Figure 9:
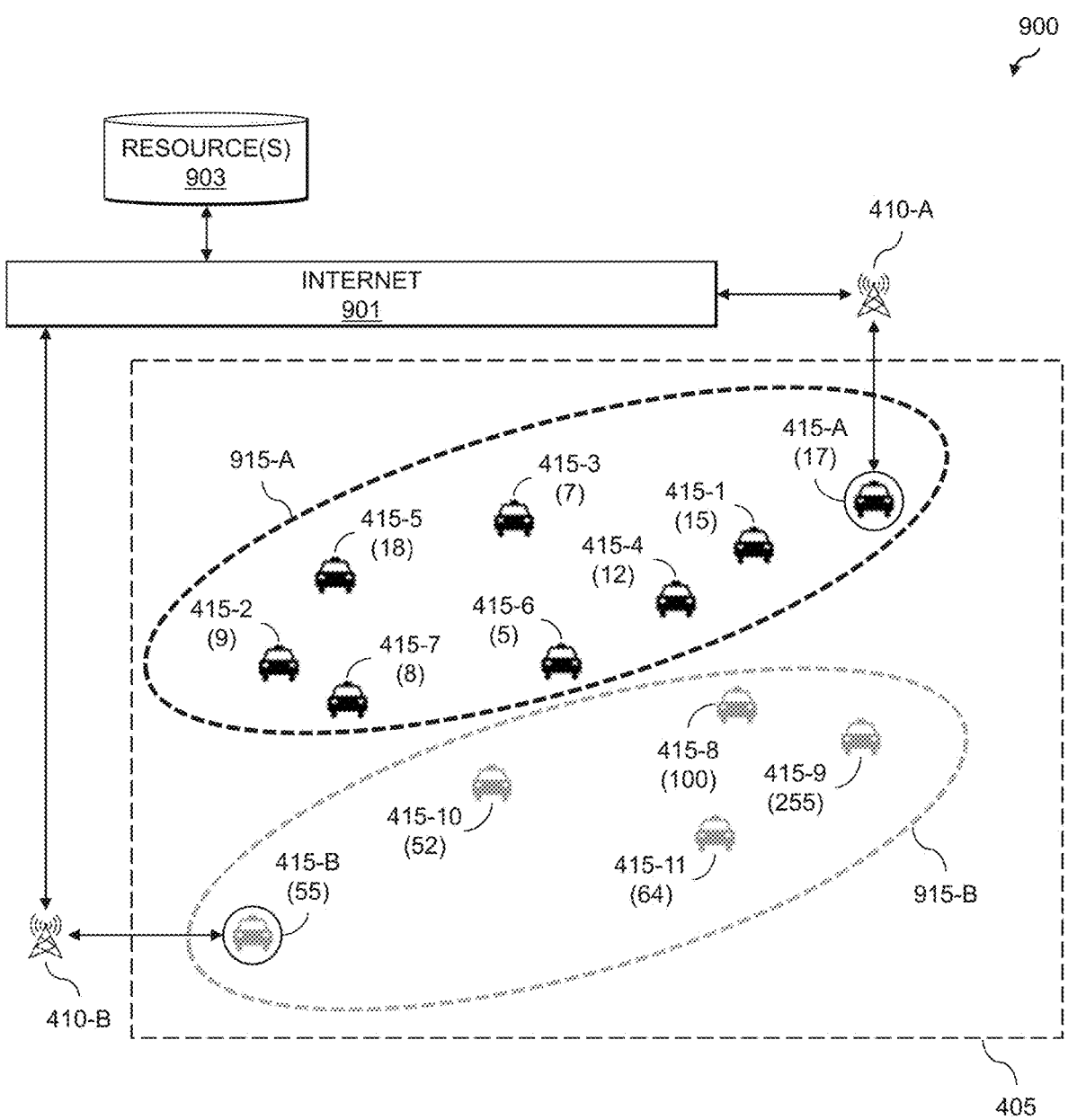
FIG. 9 shows logical distance based grouping of network nodes in a radio access network constrained coverage area of a device-to-device network in an illustrative embodiment.

FIG. 9 shows a system 900, which includes the V2V network area 405 with the connection restraint, the two radio base stations 410-A and 410-B, the two bridging network nodes 415-A and 415-B, and the constrained network nodes 415 similar to the system 400 of FIG. 4. The two radio base stations 410-A and 410-B provide connectivity to an external data network such as the Internet 901, and access to one or more resources 903 available via the Internet 901. Here, the constrained network nodes 415 are split into two groups 915-A and 915-B based on their logical distances from the bridging network nodes 415-A and 415-B. The group 915-A includes the constrained network nodes 415-1 through 415-7 which utilize the bridging network node 415-A, and the group 915-B includes the constrained network nodes 415-8 through 415-11 which utilize the bridging network node 415-B. The bridging network nodes 415-A and 415-B inform other network nodes (the constrained network nodes 415-1 through 415-11) of their identities and addresses. Each of the constrained network nodes 415 may receive information from both of the bridging network nodes 415-A and 415-B, and then calculate the logical distance between each of them before joining or being assigned to a corresponding one of the groups 915-A and 915-B. For example, the constrained network node 415-6 with the ID of "5" is closer the bridging network node 415-A with the ID of "17" than the bridging network node 415-B with the ID of "55" (17-5<55-5), and thus the constrained network node 415-6 joins the group 915-A. No matter how many bridging network nodes may appear in the V2V network area 405, they will always be paired by vehicles or network nodes in the V2V network area 405.

The technical solutions described herein provide solutions for infrastructure-less communication in V2V or other D2D networks. The connection and data exchange among vehicles or other devices are established over an infrastructure-less network. The last hop requires access to a RAN to bridge a proposed V2V/D2D network and an external data network (e.g., the Internet). Communication inside the V2V/D2D network may only utilize communication modules in the vehicles or other devices. The technical solutions also provide pure stateless connection functionality for a dynamic V2V/D2D network. All necessary information for either establishing a connection or balancing the network may be exchanged utilizing stateless mechanisms. In this way, no vehicle or device is required to maintain the state of the V2V/D2D network, such that topology changes will not affect the network too much. Based on the features provided by the stateless mechanisms, the V2V/D2D network is more suitable for dynamic topology scenarios when RAN connection is under constraints.

The technical solutions are also advantageously able to balance network load without negotiation in advance, such that the V2V/D2D network will avoid situations with unbalanced grouping. As Little's law may imply, once the speed of incoming packet ratio is higher than processing time, the network's overall performance may fail because the incoming packets may consume all the cache in the network. The physical distance between vehicles or other devices in any situation is hard to presume. Therefore, without logical grouping, the physical distance may significantly impact network performance. The technical solutions provide networks and routing therein which is based on logical groupings such that overall network performance will not be affected by an unbalanced density of vehicles or other devices in the constrained network area. Further, vehicle or other device grouping may be performed ad-hoc automatically without negotiation. The V2V/D2D network is split into multiple subgroups based on the numbers or identifiers of the bridging and constrained network nodes, without negotiation in advance. The network may automatically adjust to the right numbers. No matter how many bridging network nodes are in the V2V/D2D network, the constrained network nodes will always pick the logically closest target bridging network node as the destination for traffic to be forwarded to the external data network.

Advancements in the automotive industry show great improvements in connected vehicle communications, such that V2V networks may perform better than before. The technical solutions described herein are thus ripe for leveraging to solve various technical challenges in V2V networks. The technical solutions described herein provide a stateless solution that allows a V2V network, without negotiation, to extend RAN access to vehicles in areas that are not able to access the RAN. Since the V2V network is dynamic, the stateless solution avoids extra time in exchanging address and grouping information. Thus, topology changes due to vehicles joining or leaving the V2V network will not affect performance of the V2V network too much. Also, the grouping functionality used in some embodiments is configured to balance traffic in a way that avoids or minimizes the effects of the density of vehicles on data traffic processing. It should be noted that, in practice, network performance may still be affected by the distribution of the chosen IDs (e.g., the encoded MAC addresses in some embodiments). Different types of IDs may be selected, however, to provide a more even distribution. For example, license plate numbers or VIN numbers may be selected as the IDs used for logical grouping of network nodes. Various other examples are possible.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for exchanging data traffic between network nodes in a D2D communication network and an external data network will now be described in greater detail with reference to FIGS. 10 and 11. Although described in the context of system 100, these platforms may also be used to implement at least portions of other information processing systems in other embodiments.

Figure 10:
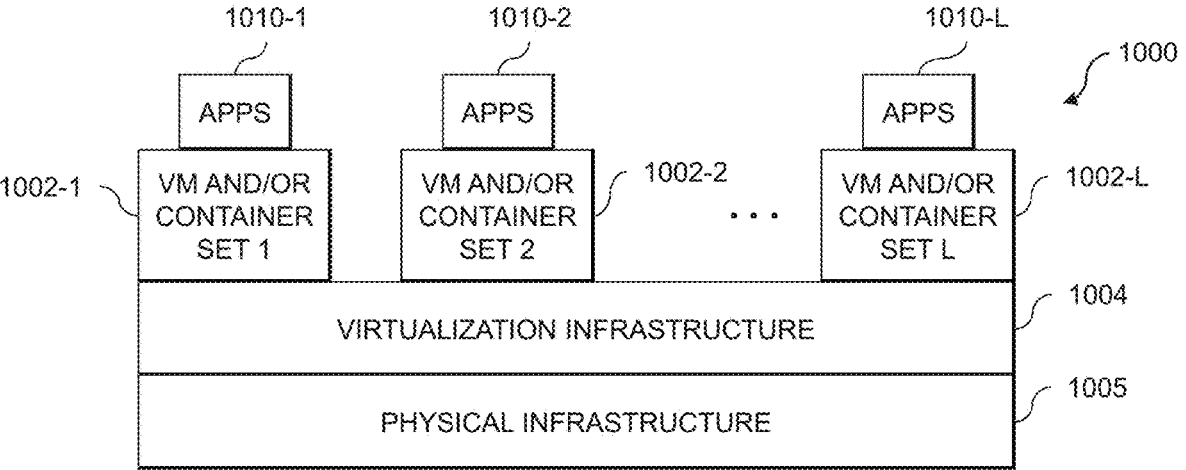
FIGS. 10 and 11 show examples of processing platforms that may be utilized to implement at least a portion of an information processing system in illustrative embodiments.
Figure 11:
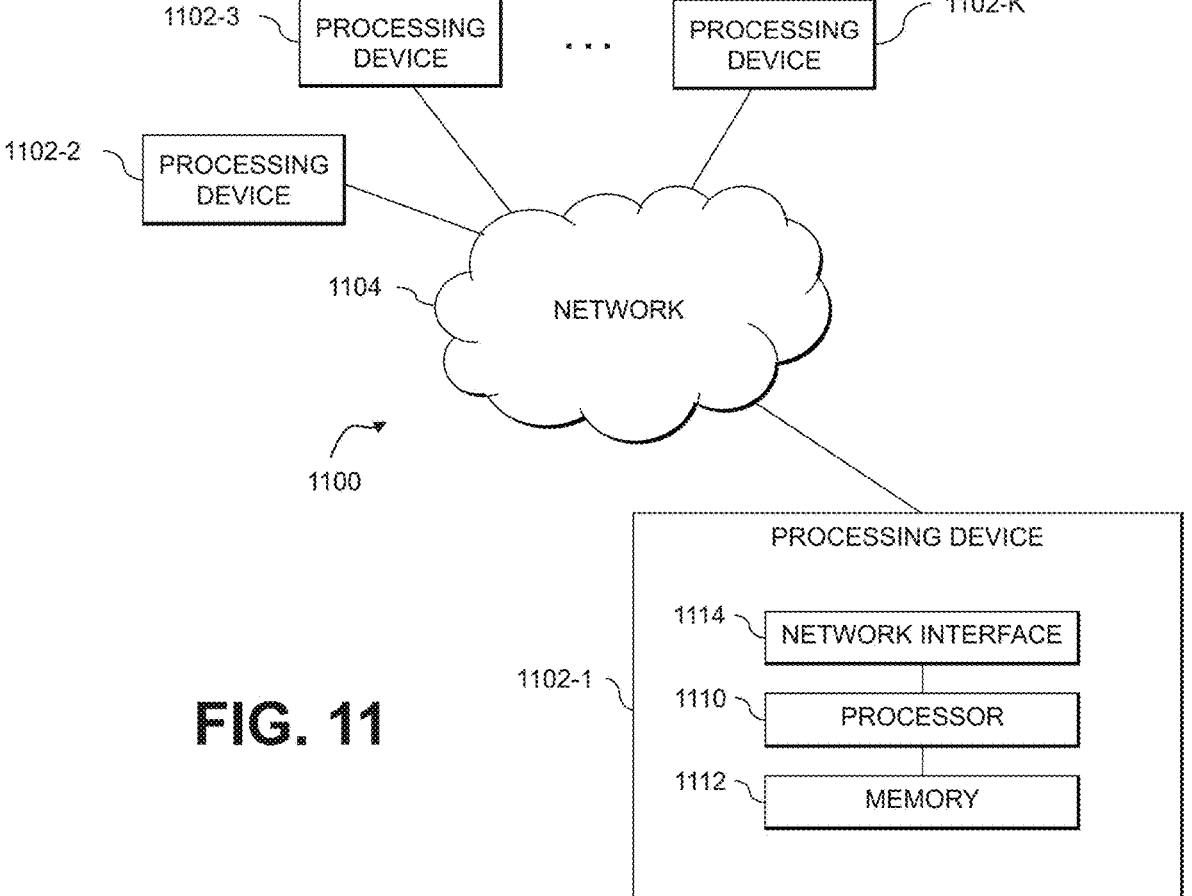

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for exchanging data traffic between network nodes in a D2D communication network and an external data network as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to generate, for a given one of a plurality of network nodes in a device-to-device communication network, a link-local network address for communications in the device-to-device communication network, wherein the link-local network address is generated based at least in part on a unique identifier associated with the given network node;

to determine at least one measure of radio access network signal strength for the given network node for at least one corresponding radio access network, the corresponding radio access network comprising one or more radio access network base stations facilitating access to a data network external to the device-to-device communication network;

responsive to the at least one measure of the radio access network signal strength being above a designated signal strength threshold, to assign a first communication role in the device-to-device communication network to the given network node;

responsive to the at least one measure of the radio access network signal strength being at or below the designated signal strength threshold, to assign a second communication role in the device-to-device communication network, different than the first communication role in the device-to-device communication network, to the given network node;

to assign the given network node to a given one of two or more groups of the plurality of network nodes based at least in part on a logical distance between the given network node and one or more other ones of the plurality of network nodes, the logical distance being based at least in part on a difference between one or more portions of the link-local network address generated for the given network node and one or more corresponding portions of one or more other link-local network addresses generated for the one or more other ones of the plurality of network nodes; and to exchange data traffic between the given network node and the external data network based at least in part on (i) which of the first communication role in the device-to-device communication network and the second communication role in the device-to-device communication network is assigned to the given network node and (ii) the given one of the two or more groups of the plurality of network nodes to which the given network node is assigned.

2. The apparatus of claim 1 wherein the device-to-device communication network comprises a vehicle-to-vehicle communication network, and wherein the given network node comprises a vehicle in the vehicle-to-vehicle communication network.

3. The apparatus of claim 2 wherein the unique identifier associated with the given network node comprises a Vehicle Identification Number (VIN).

4. The apparatus of claim 2 wherein the unique identifier associated with the given network node comprises a license plate number.

5. The apparatus of claim 1 wherein the link-local network address is generated utilizing Stateless Address Auto Configuration (SLAAC).

6. The apparatus of claim 1 wherein the unique identifier associated with the given network node comprises a Media Access Control (MAC) address.

7. The apparatus of claim 1 wherein the at least one processing device is also configured to broadcast the link-local network address generated for the given network node to the one or more other ones of the plurality of network nodes in the device-to-device communication network.

8. The apparatus of claim 1 wherein the at least one processing device is also configured to obtain link-local network addresses generated for the one or more other ones of the plurality of network nodes in the device-to-device communication network.

9. The apparatus of claim 1 wherein responsive to assigning the first communication role in the device-to-device communication network to the given network node, the data traffic for the given network node is exchanged with the external data network via at least one of the one or more radio access network base stations.

10. The apparatus of claim 1 wherein responsive to assigning the first communication role in the device-to-device communication network to the given network node, the at least one processing device is further configured to forward data traffic, for at least a subset of the one or more other ones of the plurality of network nodes that are assigned the second communication role in the device-to-device communication network and that are assigned to the given group with the given network node, to the external data network via the given network node and at least one of the one or more radio access network base stations.

11. The apparatus of claim 1 wherein responsive to assigning the second communication role in the device-to-device communication network to the given network node, the at least one processing device is further configured:

to determine the logical distance between the link-local network address generated for the given network node and the link-local network addresses generated for a subset of the one or more other ones of the plurality of network nodes assigned the first communication role in the device-to-device communication network;

to select one of the subset of the one or more other ones of the plurality of network nodes assigned the first communication role in the device-to-device communication network based at least in part on the determined logical distance; and to forward data traffic for the given network node to the external data network via the selected one of the subset of the one or more other ones of the plurality of network nodes assigned the first communication role in the device-to-device communication network.

12. The apparatus of claim 1 wherein the one or more portions of the link-local network addresses generated for the given network node and the one or more corresponding portions of the one or more other link-local network addresses generated for the one or more other ones of the plurality of network nodes comprise a last two hexadecimal digits of the link-local network addresses generated for the given network node and the one or more other network nodes.

13. The apparatus of claim 11 wherein selecting one of the subset of the one or more other ones of the plurality of network nodes assigned the first communication role in the device-to-device communication network is further based at least in part on a number of hops between the given network node and each of the subset of the one or more other ones of the plurality of network nodes assigned the first communication role in the device-to-device communication network.

14. A computer program product comprising a non-transitory processor-readable storage medium having stored therein program code of one or more software programs, wherein the program code when executed by at least one processing device causes the at least one processing device:

to generate, for a given one of a plurality of network nodes in a device-to-device communication network, a link-local network address for communications in the device-to-device communication network, wherein the link-local network address is generated based at least in part on a unique identifier associated with the given network node;

to determine at least one measure of radio access network signal strength for the given network node for at least one corresponding radio access network, the corresponding radio access network comprising one or more radio access network base stations facilitating access to a data network external to the device-to-device communication network;

responsive to the at least one measure of the radio access network signal strength being above a designated signal strength threshold, to assign a first communication role in the device-to-device communication network to the given network node;

responsive to the at least one measure of the radio access network signal strength being at or below the designated signal strength threshold, to assign a second communication role in the device-to-device communication network, different than the first communication role in the device-to-device communication network, to the given network node;

to assign the given network node to a given one of two or more groups of the plurality of network nodes based at least in part on a logical distance between the given network node and one or more other ones of the plurality of network nodes, the logical distance being based at least in part on a difference between one or more portions of the link-local network address generated for the given network node and one or more corresponding portions of one or more other link-local network addresses generated for the one or more other ones of the plurality of network nodes; and to exchange data traffic between the given network node and the external data network based at least in part on (i) which of the first communication role in the device-to-device communication network and the second communication role in the device-to-device communication network is assigned to the given network node and (ii) the given one of the two or more groups of the plurality of network nodes to which the given network node is assigned.

15. The computer program product of claim 14 wherein responsive to assigning the first communication role in the device-to-device communication network to the given network node:

the data traffic for the given network node is exchanged with the external data network via at least one of the one or more radio access network base stations; and the program code when executed further causes the at least one processing device to forward data traffic, for at least a subset of the one or more other ones of the plurality of network nodes that are assigned the second communication role in the device-to-device communication network and that are assigned to the given group with the given network node, to the external data network via the given network node and at least one of the one or more radio access network base stations.

16. The computer program product of claim 14 wherein responsive to assigning the second communication role in the device-to-device communication network to the given network node, the program code when executed further causes the at least one processing device:

to determine the logical distance between the link-local network address generated for the given network node and the link-local network addresses generated for a subset of the one or more other ones of the plurality of network nodes assigned the first communication role in the device-to-device communication network;

to select one of the subset of the one or more other ones of the plurality of network nodes assigned the first communication role in the device-to-device communication network based at least in part on the determined logical distance; and to forward data traffic for the given network node to the external data network via the selected one of the subset of the one or more other ones of the plurality of network nodes assigned the first communication role in the device-to-device communication network.

17. A method comprising:

generating, for a given one of a plurality of network nodes in a device-to-device communication network, a link-local network address for communications in the device-to-device communication network, wherein the link-local network address is generated based at least in part on a unique identifier associated with the given network node;

determining at least one measure of radio access network signal strength for the given network node for at least one corresponding radio access network, the corresponding radio access network comprising one or more radio access network base stations facilitating access to a data network external to the device-to-device communication network;

responsive to the at least one measure of the radio access network signal strength being above a designated signal strength threshold, assigning a first communication role in the device-to-device communication network to the given network node;

responsive to the at least one measure of the radio access network signal strength being at or below the designated signal strength threshold, assigning a second communication role in the device-to-device communication network, different than the first communication role in the device-to-device communication network, to the given network node;

assigning the given network node to a given one of two or more groups of the plurality of network nodes based at least in part on a logical distance between the given network node and one or more other ones of the plurality of network nodes, the logical distance being based at least in part on a difference between one or more portions of the link-local network address generated for the given network node and one or more corresponding portions of one or more other link-local network addresses generated for the one or more other ones of the plurality of network nodes; and exchanging data traffic between the given network node and the external data network based at least in part on (i) which of the first communication role in the device-to-device communication network and the second communication role in the device-to-device communication network is assigned to the given network node and (ii) the given one of the two or more groups of the plurality of network nodes to which the given network node is assigned;

wherein the method is performed by at least one processing device comprising a processor coupled to a memory.

18. The method of claim 17 wherein responsive to selecting the first communication role for the given network node:

the data traffic for the given network node is exchanged with the external data network via at least one of the one or more radio access network base stations; and the method further comprises forwarding data traffic, for at least a subset of the one or more other ones of the plurality of network nodes that are assigned the second communication role in the device-to-device communication network and that are assigned to the given group with the given network node, to the external data network via the given network node and at least one of the one or more radio access network base stations.

19. The method of claim 17 wherein responsive to assigning the second communication role in the device-to-device communication network to the given network node, the method further comprises:

determining the logical distance between the link-local network address generated for the given network node and the link-local network addresses generated for a subset of the one or more other ones of the plurality of network nodes assigned the first communication role in the device-to-device communication network;

selecting one of the subset of the one or more other ones of the plurality of network nodes assigned the first communication role in the device-to-device communication network based at least in part on the determined logical distance; and forwarding data traffic for the given network node to the external data network via the selected one of the subset of the one or more other ones of the plurality of network nodes assigned the first communication role in the device-to-device communication network.

20. The method of claim 17 wherein the one or more portions of the link-local network addresses generated for the given network node and the one or more corresponding portions of the one or more other link-local network addresses generated for the one or more other ones of the plurality of network nodes comprise a last two hexadecimal digits of the link-local network addresses generated for the given network node and the one or more other network nodes.

* * * * *